United States Patent

Kong

(10) Patent No.: US 9,503,973 B2
(45) Date of Patent: Nov. 22, 2016

(54) METHOD AND APPARATUS FOR ENERGY SAVING

(75) Inventor: Weidong Kong, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 14/387,495

(22) PCT Filed: May 11, 2012

(86) PCT No.: PCT/CN2012/075337
§ 371 (c)(1),
(2), (4) Date: Sep. 23, 2014

(87) PCT Pub. No.: WO2013/166698
PCT Pub. Date: Nov. 14, 2013

(65) Prior Publication Data
US 2015/0078227 A1    Mar. 19, 2015

(51) Int. Cl.
| | |
|---|---|
| *H04W 36/16* | (2009.01) |
| *H04W 52/02* | (2009.01) |
| *H04W 36/26* | (2009.01) |
| *H04W 48/12* | (2009.01) |
| *H04W 28/20* | (2009.01) |

(52) U.S. Cl.
CPC ......... *H04W 52/0206* (2013.01); *H04W 36/16* (2013.01); *H04W 36/26* (2013.01); *H04W 28/20* (2013.01); *H04W 48/12* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,175,603 B1 | 5/2012 | Hoole | |
| 2010/0014426 A1* | 1/2010 | Cavalli | H04W 36/22 370/235 |
| 2010/0173631 A1* | 7/2010 | Kim | H04W 36/22 455/436 |
| 2010/0323704 A1* | 12/2010 | Tailor | H04W 36/32 455/438 |
| 2011/0171952 A1* | 7/2011 | Niu | H04L 43/0882 455/422.1 |
| 2011/0294508 A1 | 12/2011 | Min et al. | |
| 2012/0113846 A1 | 5/2012 | Narasimha et al. | |

(Continued)

FOREIGN PATENT DOCUMENTS

| | | |
|---|---|---|
| CN | 1984446 | 6/2007 |
| CN | 101777964 | 7/2010 |

(Continued)

OTHER PUBLICATIONS

Extended European Search Report for Application No. / U.S. Pat. No. 12876316.6-1855 / 2850875 PCT/CN2012075337, Dec. 18, 2015.

(Continued)

*Primary Examiner* — Chi H Pham
*Assistant Examiner* — Soon-Dong D Hyun
(74) *Attorney, Agent, or Firm* — Baker Botts, LLP (57) ABSTRACT

Methods and apparatuses for energy saving have been disclosed. A method for a base station serving a cell is provided. The method comprises: monitoring communication conditions of the cell; and altering a bandwidth for communication in response that the monitored communication conditions meet a predefined criterion. Energy saving may be achieved by dynamically altering the bandwidth for communication based on the communication conditions. Further, the proposed energy saving technique may be applied to various communication networks, including but not limited to, FDD system and TDD system.

16 Claims, 5 Drawing Sheets

(56) References Cited

U.S. PATENT DOCUMENTS

| | | | | |
|---|---|---|---|---|
| 2012/0202504 A1* | 8/2012 | Wegmann | ............ | H04W 28/08 |
| | | | | 455/438 |
| 2012/0270553 A1* | 10/2012 | Ha | ........................ | H04W 36/22 |
| | | | | 455/438 |
| 2013/0143578 A1* | 6/2013 | Lekutai | ............ | H04W 36/0083 |
| | | | | 455/444 |
| 2013/0279368 A1* | 10/2013 | Chou | ...................... | H04W 4/06 |
| | | | | 370/254 |

FOREIGN PATENT DOCUMENTS

| | | |
|---|---|---|
| CN | 101888675 | 11/2010 |
| CN | 101982993 | 3/2011 |
| WO | WO 2010/151185 A1 | 12/2010 |

OTHER PUBLICATIONS

PCT Notification of Transmittal of the International Search Report and the Written Opinion of the International Searching Authority, or the Declaration for International Application No. PCT/CN2012/075337, Feb. 28, 2013.

3rd Generation Partnership Project; Technical Specification Group Radio Access Network; Evolved Universal Terrestrial Radio Access (E-UTRA); Potential solutions for energy saving for E-UTRAN (Release 10), 2011.

* cited by examiner

METHOD AND APPARATUS FOR ENERGY SAVING

PRIORITY

This nonprovisional application is a U.S. National Stage Filing under 35 U.S.C. §371 of International Patent Application Serial No. PCT/CN2012/075337, filed May 11, 2012 and entitled "Method and Apparatus for Energy Saving."

FIELD OF THE INVENTION

Embodiments of the present invention generally relates to communication systems, and more particularly to a method, an apparatus, a base station, and a computer program for energy saving for wireless communication systems.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3GPP Third Generation Partnership Project
BS Base Station
CDMA Code Division Multiple Address
DL Downlink
DwPTS Downlink Pilot Time Slot
eNB enhanced NodeB, Base Station in E-UTRAN
E-UTRAN Evolved UTRAN
FDD Frequency Division Duplex
HO HandOver
IE Information Element
LTE-A Long Term Evolution-Advanced
MBSFN Multicast Broadcast Single Frequency Network
PDSCH Physical Downlink Shared Channel
QoS Quality of Service
RAT Radio Access Technology
RS Reference Signal
TDD Time Division Duplex
UE User Equipment
UL Up link
UTRAN Universal Terrestrial Radio Access Network At present, sustainable development is a long-term commitment for all people in the world. This means not only development but also innovation. People should do their best to handle the resource shortage and environment deterioration. Therefore, how to improve the power efficiency and realize the power saving becomes a significant issue.

In the telecommunication area, most mobile network operators aim at decreasing the power consumption without too much impact on their network. In this case, the greenhouse emissions are reduced, while the Operating Expense (OPEX) of operators is saved.

Thus, the power efficiency in the infrastructure and terminal becomes an essential part of the cost-related requirements in network, and there is a strong need to investigate possible network energy saving solutions.

In 3GPP, Technical Report TR36.927 gives out the energy saving description. Networks may consist of LTE cells deployed as capacity enhancement, overlaying existing and optimized 2G/3G network.

Figure 1:
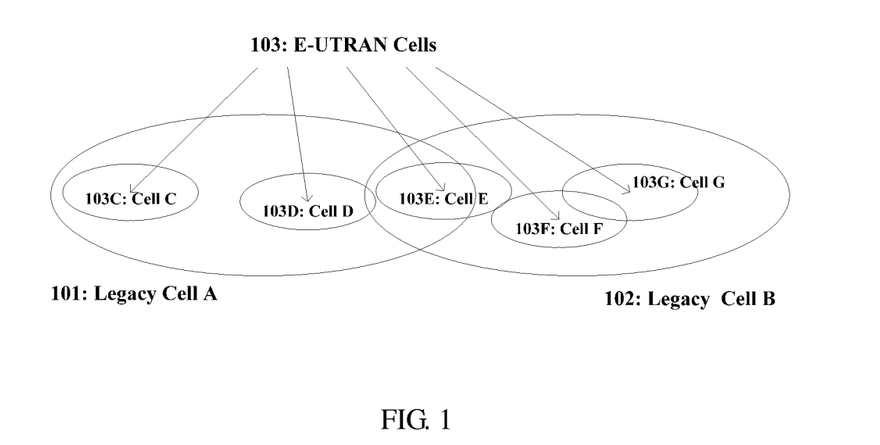
FIG. 1 illustrates a scenario for Inter-RAT energy saving.

FIG. 1 illustrates a scenario for Inter-RAT energy saving. As shown in FIG. 1, E-UTRAN Cells 103, for example Cell C 103C, Cell D 103D, Cell E 103E, Cell F 103F, and Cell G 103G, are totally covered by the same legacy RAT Cell A 101 and B 102 (e.g. UMTS or GSM). Cell A 101 and Cell B 102 have been deployed to provide basic coverage of the services in the area, while other E-UTRAN cells 103C-103G boost the capacity. The LTE cells, e.g., 103C-103G could be controlled on/off according to some operator's policy, such that the energy may be saved.

Figure 2:
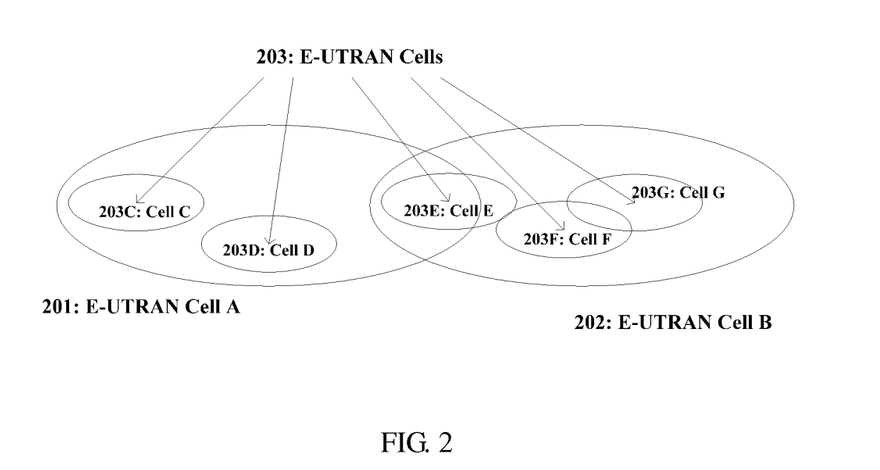
FIG. 2 illustrates a scenario for Inter-eNB energy saving.

FIG. 2 illustrates a scenario for Inter-eNB energy saving. As shown in FIG. 2, E-UTRAN Cells 203, for example Cell C 203C, Cell D 203D, Cell E 203E, Cell F 203F and Cell G 203G, are covered by the E-UTRAN Cell A 201 and B 202. Here, Cell A 201 and Cell B 202 have been deployed to provide basic coverage, while the other E-UTRAN cells 203C-203G boost the capacity. When some cells providing additional capacity are no longer needed, they may be switched off for energy optimization. In this case, both the continuity of LTE coverage and service QoS is guaranteed.

TR 36.927 also describes solutions for Intra-eNB energy saving. A single cell can operate in an energy saving mode when the resource utilization is sufficiently low. In this case, the reduction of energy consumption will be mainly based on traffic monitoring with regard to QoS and coverage assurance. In the protocol, Intra-eNB energy saving has two approaches:

1. Configuring MBSFN Subframes

MBSFN subframes have less common reference signals (CRS) than normal subframes, and hence configuring as much as possible MBSFN subframes allows reduced eNB transmission time.

2. Configuring DwPTS in Special Subframe.

For TDD, the special subframe consists of three parts, i.e. DwPTS, Guard Period and UpPTS. The length of each part is configurable. To configure the DwPTS of subframe 1 and 6 (if applicable) to the minimum length (3 OFDM symbols) can result in a subframe similar to an MBSFN subframe.

Another method for energy saving is called adaptive TDD. Different TDD DL/UL configurations consume different energy. The adaptive TDD comprises changing the TDD DL/UL configuration when operator's policy met.

However, the above mentioned Inter-RAT and Inter-eNB energy saving only consider cell level, which means to active or deactive an entire cell. Intra-eNB only consider energy saving within an eNB, but not coordinate within the network, which may generate big impact to the network, such as interference between DL and UL, lost measure object, etc.

Furthermore, the method of configuring MBSFN subframe still needs sending Reference Signal, and thus limited energy may be saved. The method of configuring DwPTS can only save a little energy, because the DwPTS consumes a small amount of energy overhead. The adaptive TDD could only be used for TDD, and could lead extra interference.

SUMMARY OF THE INVENTION

To better address one or more of the above concerns, in a first aspect of the invention, a method for a base station serving a cell is provided. The method comprises: monitoring communication conditions of the cell; and altering a bandwidth for communication in response that the monitored communication conditions meet a predefined criterion.

In one embodiment, the altering may be performed by a handover procedure.

In some embodiments, the altering may comprise, before altering the bandwidth, handovering out all or part of user equipments served by the base station. After the part of the user equipments have been handovered out, user equipments which are unsuccessfully handovered out or not handovered out may be released.

In some embodiments, the altering may further comprise broadcasting the altered bandwidth.

In some embodiments, the method may further comprise handovering in the user equipments previously handovered out after altering the bandwidth.

In some embodiments, the method may further comprise accepting user equipment attachment after altering the bandwidth.

In another embodiment, the altering may be performed by a system information update procedure.

In various embodiments, the communication conditions may comprise at least one of the number of user equipments, traffic throughput, and interference information of neighbouring cells.

In a second aspect of the invention, an apparatus is provided to implement various embodiments of the method of the first aspect of the invention. The apparatus may comprise a controller, configured to monitor communication conditions of the cell and determine whether the communication conditions meet a predefined criterion; and a handler, configured to alter a bandwidth for communication in response to the controller determining that the monitored communication conditions meet the predefined criterion.

In a third aspect of the invention, an apparatus for a base station serving a cell is provided, which comprises means for implementing each step of the method of the first aspect of the invention.

In a fourth aspect of the invention, an apparatus is provided, which comprises at least one processor and at least one memory including computer program code. The memory and the computer program code are configured to cause the processor to perform embodiments of the method of the first aspect of the invention.

In a fifth aspect of the invention, a computer program product is provided, which, comprises at least one computer readable storage medium having a computer readable program code portion stored thereon. The computer readable program code portion comprises program code instructions for perform embodiments of the method of the first aspect of the invention.

Particular embodiments of the subject matter described in this specification can be implemented so as to realize one or more of the following advantages.

With particular embodiments of the techniques described in this specification, energy saving may be achieved by dynamically altering the bandwidth for communication based on the communication conditions. Further, the proposed energy saving technique may be applied to various communication networks, including but not limited to, FDD system and TDD system.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Wireless communication systems include a network of devices for providing wireless connectivity to wireless-enabled devices including mobile units, smart phones, tablet devices, laptops, desktops, and other types of user equipment. The network access devices include base stations, base station routers, access points, e-node-Bs (eNBs), and the like. The entities within the wireless communication system generally conform to standards and/or protocols that facilitate communication over the air interface. For example, wireless communication systems are currently being developed that operate according to the Long Term Evolution (LTE) standards and/or protocols defined by the Third Generation Partnership Project (3GPP, 3GPP2). The LTE-Advanced standard supports both frequency division duplexing (FDD) and time division duplexing (TDD).

The inventor notes that, meaningful energy saving may be achieved if base stations in business buildings are put in a power saving mode during weekend or nights when network traffic is considerably light. In the power saving mode, the bandwidth for communication may be reduced.

In LTE, carrier aggregation is supported, and thus various bandwidths are supported, for example, a bandwidth of 1.4M, 5M, 10M, 15M, 20M, and even 100M. When the coverage is unchanged, which means to keep the Power Spectrum Density (PSD) of each subcarrier, less carriers and a smaller bandwidth could be used for system in order to save the power.

For example, in the day time, when the load is high, a bandwidth of 20M may be configured to support the high load; in the midnight, when the load is low, a bandwidth of 1.4M may be configured to support the low load, which could save the power up to 93%.

Figure 3:
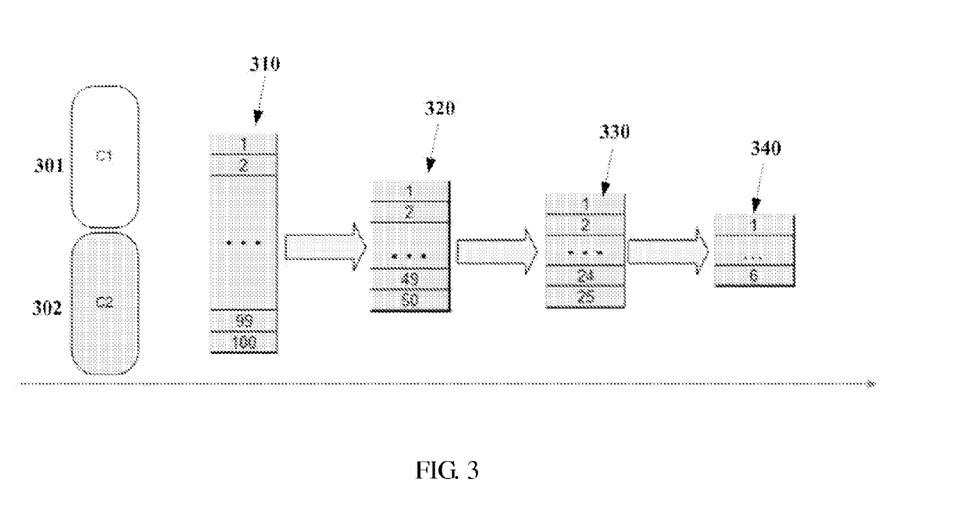
FIG. 3 illustrates examples of bandwidth change.

FIG. 3 schematically illustrates examples of bandwidth change. As shown in FIG. 3, two carriers C1 301 and C2 302 are depicted. As indicated by 310, the carrier C2 may comprise 100 Resource Blocks (RBs), i.e., a bandwidth of 20 MHz. In some cases, as indicated by 320, the carrier C2 may comprise 50 RBs, i.e., a bandwidth of 10 MHz. In some cases, as indicated by 330, the carrier C2 may comprise 25 RBs, i.e., a bandwidth of 5 MHz. In some cases, as indicated by 340, the cattier C2 may only comprise 6 RBs, i.e., a bandwidth of 1.4 MHz.

Although the above content has discussed bandwidth change through the carrier aggregation in LTE, the skilled in the art could appreciate that, the carrier aggregation may be used in other system than LTE, for example CDMA EVDO (Evolution Data Optimized). Further, the skilled in the art could also appreciate that the bandwidth may be changed by other techniques, and the present invention has no limitation in this regard.

In the following description, the proposed mechanism will be detailed with respect to exemplary embodiments illustrated in the drawings.

Figure 4:
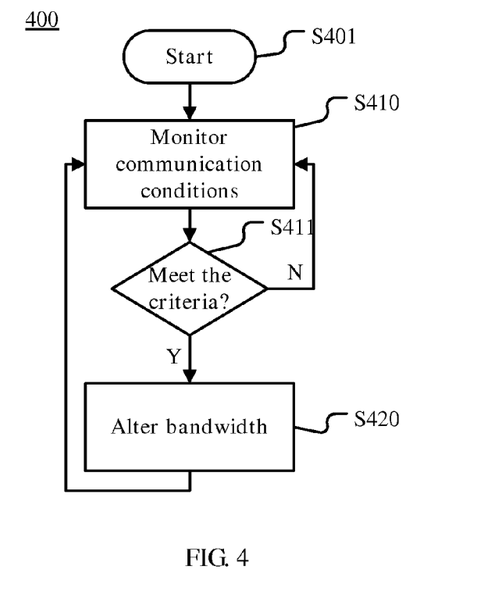
FIG. 4 illustrates an exemplary flowchart of a method 400 according to embodiments of the present invention.

FIG. 4 illustrates an exemplary flowchart of a method 400 according to embodiments of the present invention. The method 400 may be performed for a base station serving a cell. The skilled in the art could understand that, the method 400 may be performed by an entity in the base station, or an entity in the other network element or by multiple entities distributed among various network elements, such as base station, radio network controller (RNC), Media Gateway (MGW), etc.

As shown in FIG. 4, the method 400 may begin at the step S401 and proceed to the step S410. At the step S410, communication conditions of the cell may be monitored.

The communication conditions may comprise load information within the cell, such as the number of user equipments (UEs), traffic throughput. The communication conditions may also comprise interference information of neighboring cells. Optionally, the communication conditions may further comprise QoS requirements of the user equipments or something other related.

Those communication conditions may be monitored through observability function of the base station. For example, traffic throughput may comprise resource (including software and hardware) usage, the level of the throughput, etc., which may be obtained by monitoring the running state of the base station.

In one embodiment, exemplary monitored communication conditions may be: 10 UEs, the utilization ratio of resource blocks is 10%, and the average bit rate is 5 Mbps.

Then, at the step S411, it is determined whether the monitored communication conditions meet one or more predefined criteria. In some embodiments, the predefined criteria are used to decide whether the bandwidth needs to be altered and what bandwidth should be used under such communication conditions. In this regard, the criteria may be predefined by multiple thresholds associated with the communication conditions. As an example, three kinds of thresholds are introduced as threshold of the number of UE (T_Nr_UE), threshold of resource block utilization (T_RB_Uti), and threshold of the cell throughput (T_TPT). For each kind of threshold, we could have a series ranks: T_Nr_UE0~T_Nr_UE3, T_RB_$Uti0$~T_RB_Uti3, and T_TPT0~T_TPT3. If (number of UE<=T_Nr_UE0), and/or (RB resource utilization<=T_RB_Uti0), and/or (cell throughput<=T_TPT0), use bandwidth of 1.4M. If (T_Nr_UE0<number of UE<=T_Nr_UE1) and/or (T_RB_Uti0<RB resource utilization<=T_RB_Uti1) and/or (T_TPT0<cell throughput<=T_TPT1), use bandwidth of 5M, etc.

The skilled in the art should appreciate that multiple thresholds may be associated with one communication condition, such as the number of UEs. In this way, granularity of the bandwidth may be varied.

Take the above monitored communication conditions and the exemplary criterion as an example, at the step S411, it can be determined that the monitored communication conditions meet one of the predefined criteria. Thus, the method 400 goes to the step S420, at which the bandwidth for communication is altered in response that the monitored communication conditions meet the predefined criterion.

It can be seen from the above discussion about the criterion, the new bandwidth is decided according to the predefined criterion and the monitored communication conditions. For example, going with the above example, the new bandwidth may be decided as, e.g., 1.4 MHz.

If it is determined that the monitored communication conditions do not meet any criterion, then the method 400 returns back to the step S410, where the communication conditions are always monitored.

Thus above has discussed the proposed bandwidth alteration mechanism. With particular embodiments of the techniques described in this specification, energy saving may be achieved by dynamically altering the bandwidth for communication based on the communication conditions. Further, such adaptive bandwidth mechanism may save not only the Physical Downlink Shared Channel (PDSCH) power, but also the Reference Signal (RS) power. By decreasing the bandwidth when the load is relative low, interference could also be decreased more, so more frequency efficiency may be gotten. Additionally, compared with the adaptive TDD scheme as introduced in the Background, no extra interference is introduced, and thus there is no need to coordinate between neighboring cells. The proposed energy saving technique may be used in any network, regardless TDD or FDD, which could change its carrier number or bandwidth.

In some embodiments where interference from neighboring cells is monitored, the alteration of bandwidth may take into account such interference, so that there is possibility that the reduced bandwidth for the cell in question may stay away from those interfering bandwidth of neighboring cells.

During the alteration of the bandwidth, various methods may be used to communicate with UEs about the new bandwidth.

Figure 5:
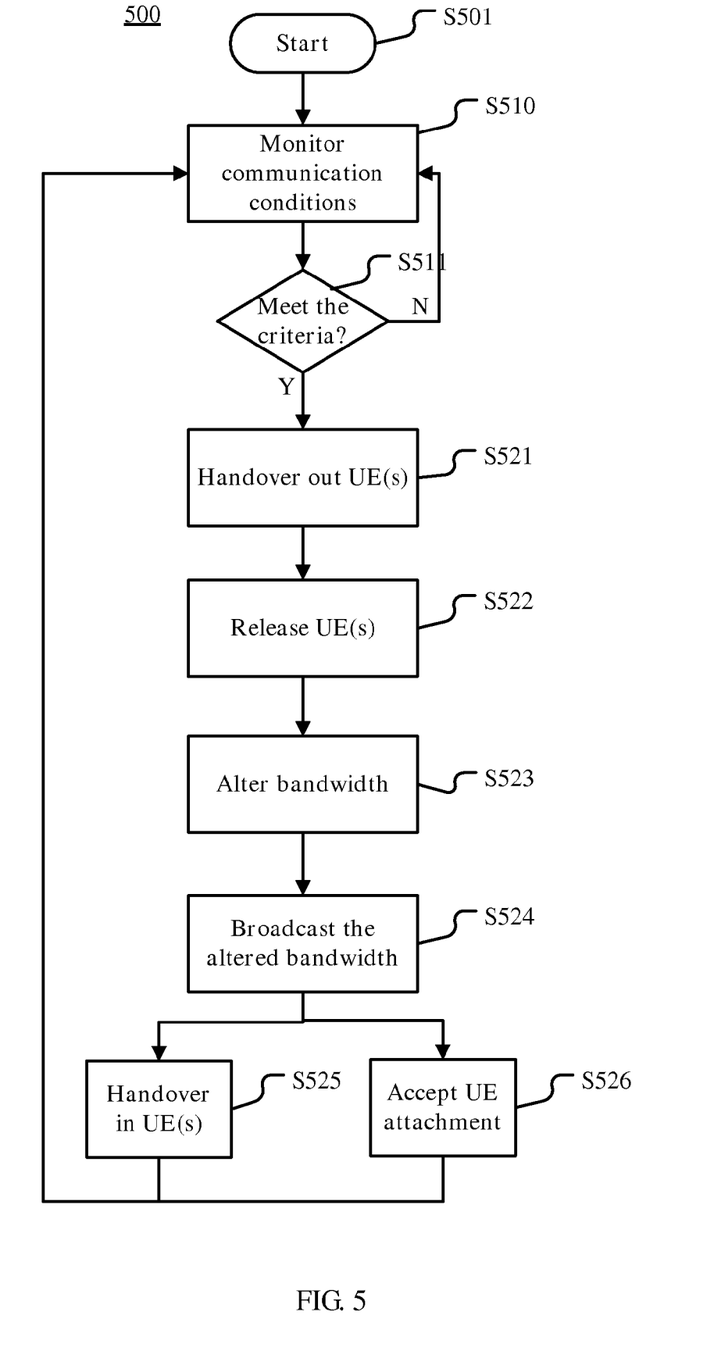
FIG. 5 illustrates an exemplary flowchart of a method 500 according to one embodiment of the present invention.

FIG. 5 illustrates an exemplary flowchart of a method 500 according to one embodiment of the present invention. According to the method 500, a handover procedure is used to perform the alteration. Steps S501, S510, and S511 of the method 500 are the same as the steps S401, S410, and S411 of the method 400 as illustrated in FIG. 4, and thus the description thereof is omitted here.

Having decided to alter the bandwidth, at the Step S521, before altering the bandwidth, the BS will handover out all or part of the UEs in its cell, i.e., the connected UEs, to other RAT or to other BS whose coverage could cover its area. If only part of the UEs will be handovered out, then the UEs may be selected based on their priorities, such as QoS requirements. The UEs with high priority will be handovered out, so that other BSs would continue providing service for them. A handover procedure is well developed in the art, and the present invention has no limitation in the handover method.

Then, at the Step S522, if no suitable cells to accept those handovered out UEs, the BS will release these UEs which are unsuccessfully handovered out. Also, the BS will release those UEs being not handovered out. Generally, the number of UEs that will be released is very small, and thus, no big impact would be generated.

After that, the BS will alter the bandwidth at the step S523 and start to use the new bandwidth. The alteration of bandwidth may be implemented by carrier aggregation or the inversion process of carrier aggregation.

Then, the altered bandwidth will be broadcasted in the cell at the step S524. The information of bandwidth may be carried by system information, such as Master Information Block (MIB). The skilled in the art could understand that other information elements may also be used to broadcast the new bandwidth.

In turn, the method 500 may optionally proceed to the step S525, at which the BS will handover in the UEs which are belong to it before the altering of the bandwidth.

In some embodiments, after broadcasting the altered bandwidth, the BS may start to accept UE attachment at the step S526.

The method 500 is for illustration only and the steps of the method 500 may be combined, divided, or arranged in a different order than illustrated, without departing from the scope of the invention of this example embodiment. For example, the step S522 may be performed prior to the step S521. In such case, the BS may release those UEs with low priority directly, and then handover out those UEs with high priority.

With the method 500 described above, such alteration through a handover procedure may provide good service, because the users of those UEs can hardly perceive the alteration of the bandwidth, and thus obtain good experiences. Further, a handover procedure is well developed, and thus no more signaling complexity may be introduced.

Figure 6:
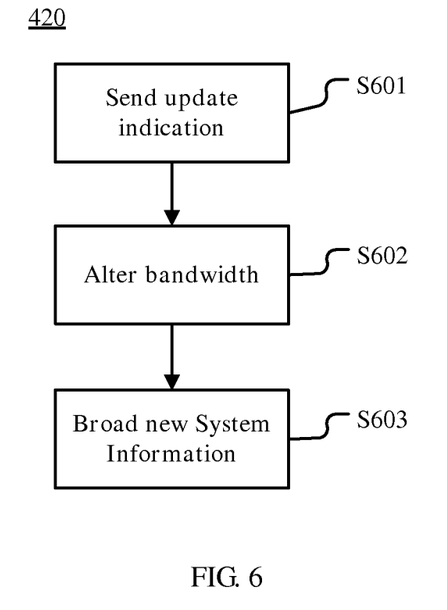
FIG. 6 illustrates an exemplary flowchart of the step S420 according to one embodiment of the present invention.

FIG. 6 illustrates an exemplary flowchart of the step S420 according to one embodiment of the present invention. The steps S401, S410, and S411 are omitted here for simplification. In this exemplary embodiment, the step S420 of altering the bandwidth may be performed by a system information update procedure.

As shown in FIG. 6, at the step S601, the BS will send system information update indication. For UEs in different modes, the BS may send corresponding system information update indication. For example, for UEs in idle mode, the BS may send paging type 1 message. For UEs in CELL FACH, the BS may send system information change indication message. Both of the messages are to notify the UEs to re-read out the system information, for example, MIB. In this case, each of the two messages comprises MIB new value tag.

Then, at the step S602, the BS will alter the bandwidth and start to use the new bandwidth, just like the step S523 in FIG. 5.

After altering the bandwidth, the BS will broadcast the new bandwidth at the step S603. Then, the UEs which have been notified will read the system information and obtain the new bandwidth.

With the method for the step S420 described in FIG. 6, a system information update procedure may be used to notify the UEs served by the BS of the new bandwidth. According to the above method, although the UEs may consume some time to obtain the new bandwidth, such method provides direct interaction between the BS and its UEs, and does not need to release any UE.

Figure 7:
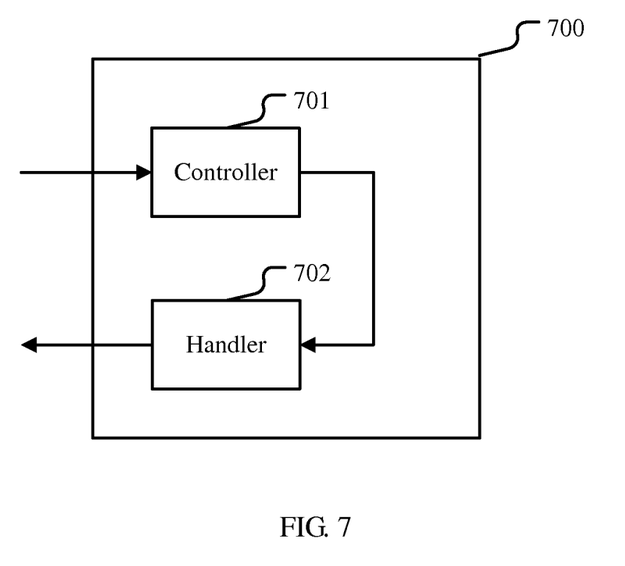
FIG. 7 is a schematic block diagram of an apparatus 700 that may be configured to practice the exemplary embodiments of the present invention.

FIG. 7 is a schematic block diagram of an apparatus 700 that may be configured to practice the exemplary embodiments of the present invention.

As shown in FIG. 7, the apparatus 700 may comprise a controller 701 and a handler 702. The apparatus 700 may be incorporated in a BS and be configured to perform methods of the exemplary embodiments of the present invention. Alternatively, the apparatus 700 may be distributed among various network elements, so as to perform the methods of the exemplary embodiments of the present invention.

The controller 701 may be configured to monitor communication conditions of the cell and determine whether the communication conditions meet a predefined criterion.

The communication conditions may comprise at least one of the number of user equipments, traffic throughput, and interference information of neighboring cells.

The handler 702 may be configured to alter a bandwidth for communication in response to the controller 701 determining that the monitored communication conditions meet the predefined criterion.

In one embodiment, the handler 702 may be configured to alter the bandwidth by a handover procedure.

In further embodiments, the handler 702 may be configured to, before altering the bandwidth, handover out all or part of user equipments served by the base station. After handovering out the part of the user equipments, the handler 702 may be configured to release user equipments which are unsuccessfully handovered out or not handovered out.

The handler 702 may be further configured to broadcast the altered bandwidth.

Optionally, the handler 702 may be further configured to handover in the user equipments previously handovered out after altering the bandwidth.

Having altered the bandwidth, the handler 702 is further configured to accept user equipment attachment.

In another embodiment, the handler 702 may be configured to alter the bandwidth by a system information update procedure, for example MIB update procedure.

Figure 8:
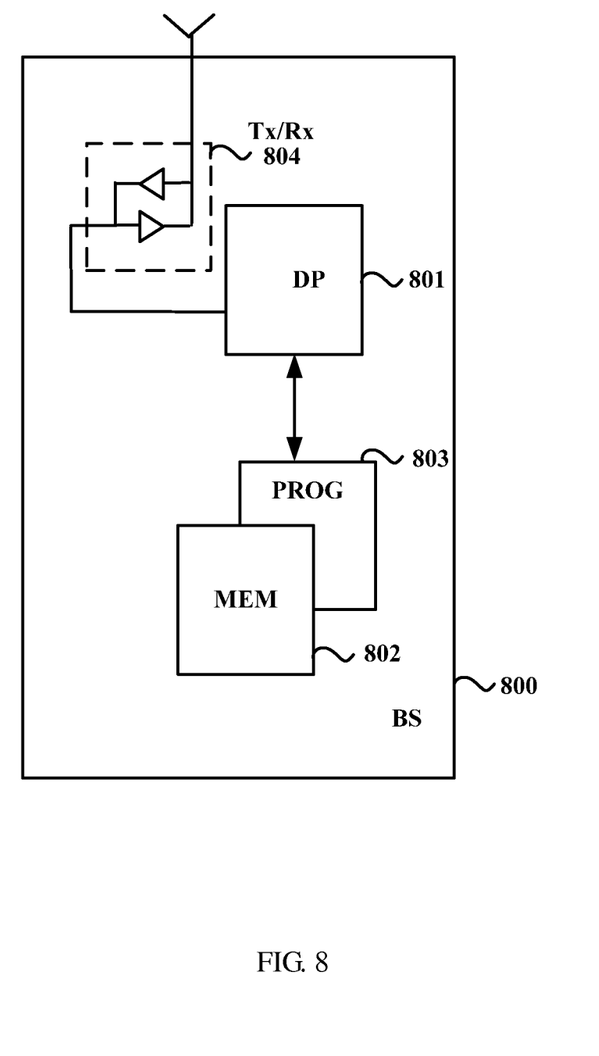
FIG. 8 illustrates a simplified block diagram of a BS 800 that is suitable for use in practicing the exemplary embodiments of the present invention.

FIG. 8 illustrates a simplified block diagram of a BS 800 that are suitable for use in practicing the exemplary embodiments of the present invention.

As shown in FIG. 8, the BS 800 includes a data processor (DP) 801, a memory (MEM) 802 coupled to the DP 801, and a suitable RF transmitter TX and receiver RX 804 coupled to the DP 801. The MEM 802 stores a program (PROG) 803. The TX/RX 804 is for bidirectional wireless communications with UEs. Note that the TX/RX 804 has at least one antenna to facilitate communication, though in practice a BS will typically have several. The BS 800 may be coupled via a data path to one or more external networks or systems, such as the internet, for example.

The PROG 803 is assumed to include program instructions that, when executed by the associated DP 801, enable the BS 800 to operate in accordance with the exemplary embodiments of this invention, as discussed herein with the methods 400, or 500.

The embodiments of the present invention may be implemented by computer software executable by the DP 801 of the BS 800, or by hardware, or by a combination of software and hardware.

The MEM 802 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 800, there may be several physically distinct memory units in the BS 800. The DP 801 may be of any type suitable to the local technical environment, and may include one or more of general purpose computers, special purpose computers, microprocessors, digital signal processors (DSPs) and processors based on multicore processor architecture, as non limiting examples. The BS 800 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for a base station serving a cell, comprising:
monitoring communication conditions of the cell; and
altering a bandwidth for communication in response that the monitored communication conditions meet a predefined criterion, wherein altering the bandwidth for communication comprises:
selecting one or more user equipments from a plurality of user equipments based on a priority associated with each of the selected one or more user equipments; and
performing a handover procedure for the selected one or more user equipments.

2. The method of claim 1, wherein the altering the bandwidth for communication further comprises releasing user equipments which are unsuccessfully handovered out or not handovered out.

3. The method of claim 1, wherein the altering the bandwidth for communication further comprises broadcasting the altered bandwidth.

4. The method of claim 1, further comprising handovering in the user equipments previously handovered out after altering the bandwidth for communication.

5. The method of claim 1, further comprising accepting user equipment attachment after altering the bandwidth for communication.

6. The method of claim 1, wherein altering the bandwidth for communication is performed by a system information update procedure.

7. The method of claim 1, wherein the communication conditions comprise at least one of the number of user equipments, traffic throughput, and interference information of neighboring cells.

8. The method claim 1, wherein the criterion is defined for deciding what bandwidth should be used under certain communication conditions.

9. An apparatus for a base station serving a cell, comprising:
a controller configured to monitor communication conditions of the cell and determine whether the communication conditions meet a predefined criterion; and a handler configured to alter a bandwidth for communication in response to the controller determining that the monitored communication conditions meet the predefined criterion, wherein altering the bandwidth for communication comprises:
  selecting one or more user equipments from a plurality of user equipments based on a priority associated with each of the selected one or more user equipments; and
  performing a handover procedure for the selected one or more user equipments.

10. The apparatus of claim 9, wherein the handler is further configured to release user equipments which are unsuccessfully handovered out or not handovered out.

11. The apparatus of claim 9, wherein the handler is further configured to broadcast the altered bandwidth.

12. The apparatus of claim 9, wherein the handler is further configured to handover in the user equipments previously handovered out after altering the bandwidth.

13. The apparatus of claim 9, wherein the handler is further configured to accept user equipment attachment after altering the bandwidth.

14. The apparatus of claim 9, wherein the handler is configured to alter the bandwidth for communication using a system information update procedure.

15. The apparatus of claim 9, wherein the communication conditions comprise at least one of the number of user equipments, traffic throughput, and interference information of neighboring cells.

16. The apparatus of claim 9, wherein the criterion is defined for deciding what bandwidth should be used under certain communication conditions.

* * * * *